US012771397B2

(12) United States Patent
Aneja

(10) Patent No.: US 12,771,397 B2
(45) Date of Patent: Oct. 20, 2026

(54) MOBILE DEVICE MOUNT FOR A ROWING MACHINE

(71) Applicant: Neil Aneja, Roanoke, VA (US)

(72) Inventor: Neil Aneja, Roanoke, VA (US)

( * ) Notice: Subject to any disclaimer, the term of this patent is extended or adjusted under 35 U.S.C. 154(b) by 344 days.

(21) Appl. No.: 18/645,506

(22) Filed: Apr. 25, 2024

(65) Prior Publication Data

US 2024/0364377 A1 Oct. 31, 2024

Related U.S. Application Data

(60) Provisional application No. 63/461,740, filed on Apr. 25, 2023.

(51) Int. Cl.
*H04B 1/3877* (2015.01)
*H04M 1/04* (2006.01)

(52) U.S. Cl.
CPC ............ *H04B 1/3877* (2013.01); *H04M 1/04* (2013.01)

(58) Field of Classification Search
CPC ............................... H04B 1/3877; H04M 1/04
See application file for complete search history.

(56) References Cited

U.S. PATENT DOCUMENTS

| | | | | | |
|---|---|---|---|---|---|
| D1,048,710 | S | * | 10/2024 | Mica ...................... | A61K 45/06 D6/310 |
| 2014/0257537 | A1 | * | 9/2014 | Stroupe ............. | H04M 1/72409 700/91 |
| 2015/0138099 | A1 | * | 5/2015 | Major ................... | H04W 4/027 345/173 |
| 2021/0354002 | A1 | * | 11/2021 | Schaefer ............ | A63B 71/0622 |
| 2022/0063746 | A1 | * | 3/2022 | Song ...................... | B62J 50/225 |
| 2024/0267071 | A1 | * | 8/2024 | Sa ........................... | H04M 1/04 |

OTHER PUBLICATIONS

Amazon.com; Phone Holder Made for PM5 Monitors of Concept 2 Rower, SkiErg and BikeErg-Silicone Smartphone Cradle Compatible with Concept 2 Rowing Machine. Ideal Rower Accessories; https://www.amazon.com/Holder-Concept-Rowing-Machine-BikeErg/dp/B07YN5CP6Z/ref=sr_1_5?crid=2P24BJ1DLB9IE&keywords=rowing%2Bmachine%2Bphone%2Btablet%2Bholder&qid=1679666491&sprefix=rowing%2Bmachine%2Bphone%2Btablet%2Bhold%2Caps%2C578&sr=8-5&th=1; last visited: Aug. 16, 2024.

Amazon.com; Phone Holder for Concept 2 Rowing Machine Monitor, Adjustable Rotatable Smartphone Cradle/Phone Mount Compatible with PM 2/3/4/5 Monitors of RowErgs, SkiErg and BikeErg (Concept 2 Rower)—Black; https://www.amazon.com/Adjustable-Rotatable-Smartphone-Compatible-Monitors/dp/B0B3RKLTS8/ref=sr_1_10?crid=2P24BJ1DLB9IE&keywords=rowing+machine+phone+tablet+holder&qid=1679666543&sprefix=rowing+machine+phone+tablet+hold%2Caps%2C578&sr=8-10; last visited: Aug. 16, 2024.

Amazon.com; Phone & Tablet Holder for Concept 2 Rowing Machine PM5 Monitor, All-in-One Tablet Mount for C2 Rower Suitable for Tablets & Phones & iPad for Any Screen Size, Compatible with PM5 Only; https://www.amazon.com/JISHAHS-Concept-Machine-Suitable-Compatible/dp/B09Y8LH6L2/ref=sr_1_4?crid=2UXX5NLT2BDA0&keywords=concept+rowing+machine+phone+tablet+holder&qid=1679666617&sprefix=concept+rowing+machine+phone+tablet+holder%2Caps%2C132&sr=8-4; last, Aug. 16, 2024.

* cited by examiner

*Primary Examiner* — Raymond S Dean
(74) *Attorney, Agent, or Firm* — Dickinson Wright PLLC

(57) ABSTRACT

A mobile device support for a rowing machine. The mobile device support includes a machine bracket that is configured to connect the mobile device support to a control monitor of the rowing machine. A device holder is rotatably connected to the machine bracket. The device holder is configured to hold a mobile device. The device holder has a central member and a pair of clamps that are moveable relative to the central member for holding mobile devices of different sizes.

20 Claims, 12 Drawing Sheets

MOBILE DEVICE MOUNT FOR A ROWING MACHINE

CROSS-REFERENCE TO RELATED APPLICATIONS

This utility patent application claims the benefit of and priority to U.S. provisional patent application Ser. No. 63/461,740, filed on Apr. 25, 2023, the entire disclosure of which is hereby incorporated by reference in their entireties.

FIELD OF THE INVENTION

The present disclosure relates to mounts for holding mobile devices, such as smart phones and tablets. More particularly the present disclosure relates to a mount for holding mobile devices that is configured to attach to a rowing exercise machine.

BACKGROUND

A rowing machine is a type of exercise machine for simulating the experience of rowing while in an indoor environment. Rowing machines typically include a control monitor for presenting exercise metrics, e.g., a time of use and distance covered, to the user. The control monitor is typically positioned at a location which permits the user to view the control monitor while exercising. There remains a need for improvements to rowing machines to further enhance the exercise experience for users.

SUMMARY OF THE INVENTION

According to an aspect of the disclosure, a mobile device support for a rowing machine is provided. The mobile device support includes a machine bracket that is configured to connect the mobile device support to a control monitor of the rowing machine. A device holder is rotatably connected to the machine bracket. The device holder is configured to hold a mobile device. The device holder has a central member and a pair of clamps being moveable relative to the central member for holding mobile devices of different sizes.

Accordingly, the subject mobile device support is capable of being removably connected to a control monitor of a rowing machine, thereby positioning the user's mobile device at a location which is easy to observe while exercising. Furthermore, the subject mobile device support is adjustable in several different ways, which provides easy attachment to the control monitor, permits the mobile device support to accommodate mobile devices of various sizes, and allows an orientation of the mobile device to easily be adjusted.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the figures, wherein like numerals indicate corresponding parts throughout the several views, a mobile device support 10 for a rowing machine is provided. More particularly, the mobile device support 10 permits a user to position a mobile device 12A, 12B, such as a smart phone 12A (e.g., FIGS. 4-7) or tablet 12B (e.g., FIGS. 9) on a rowing machine such that the mobile device 12A, 12B may be viewed while the user exercises on the rowing machine.

Figure 1:
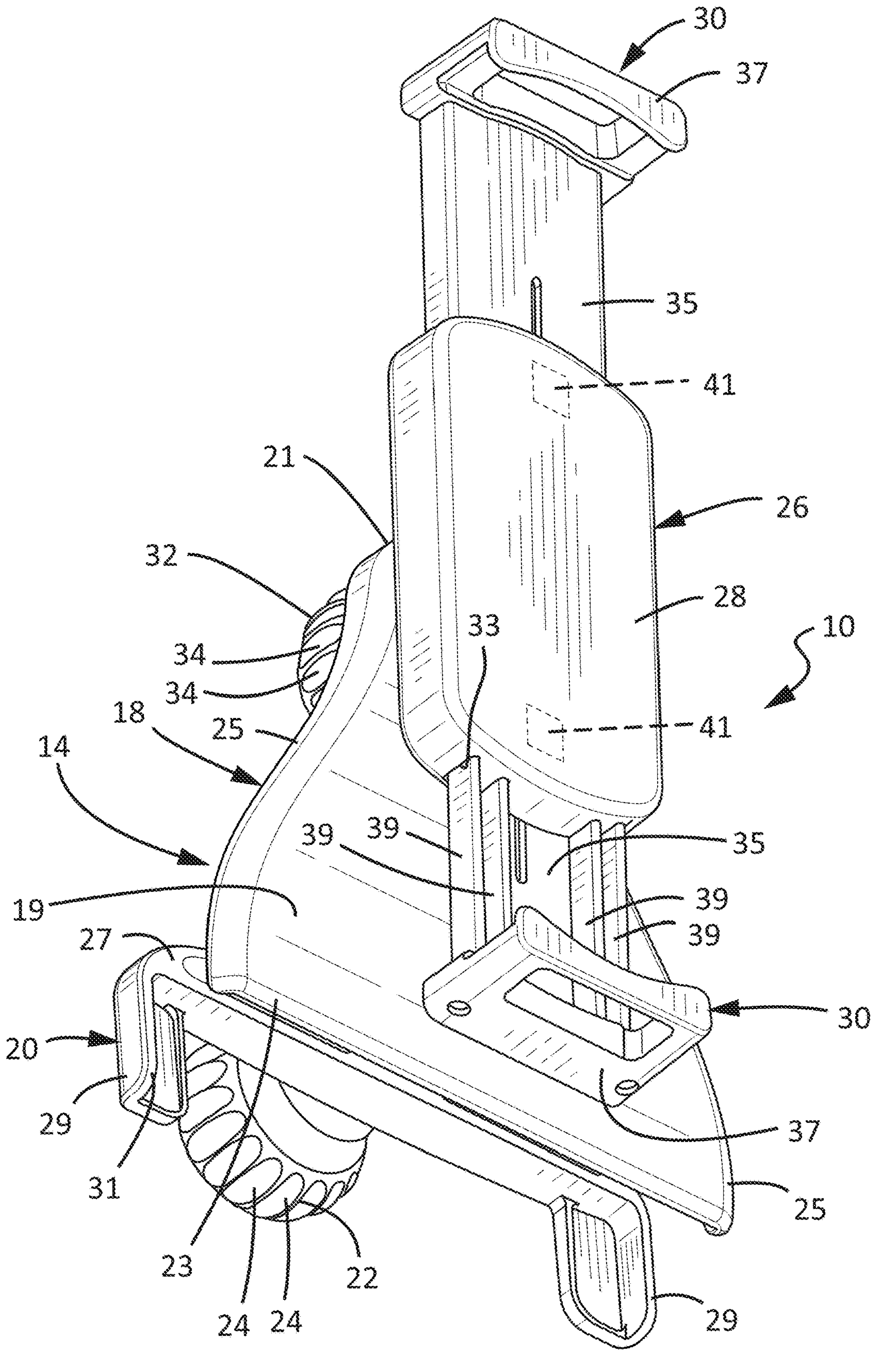
FIG. 1 is a front perspective view of a mobile device holder according to an aspect of the present disclosure.
Figure 2:
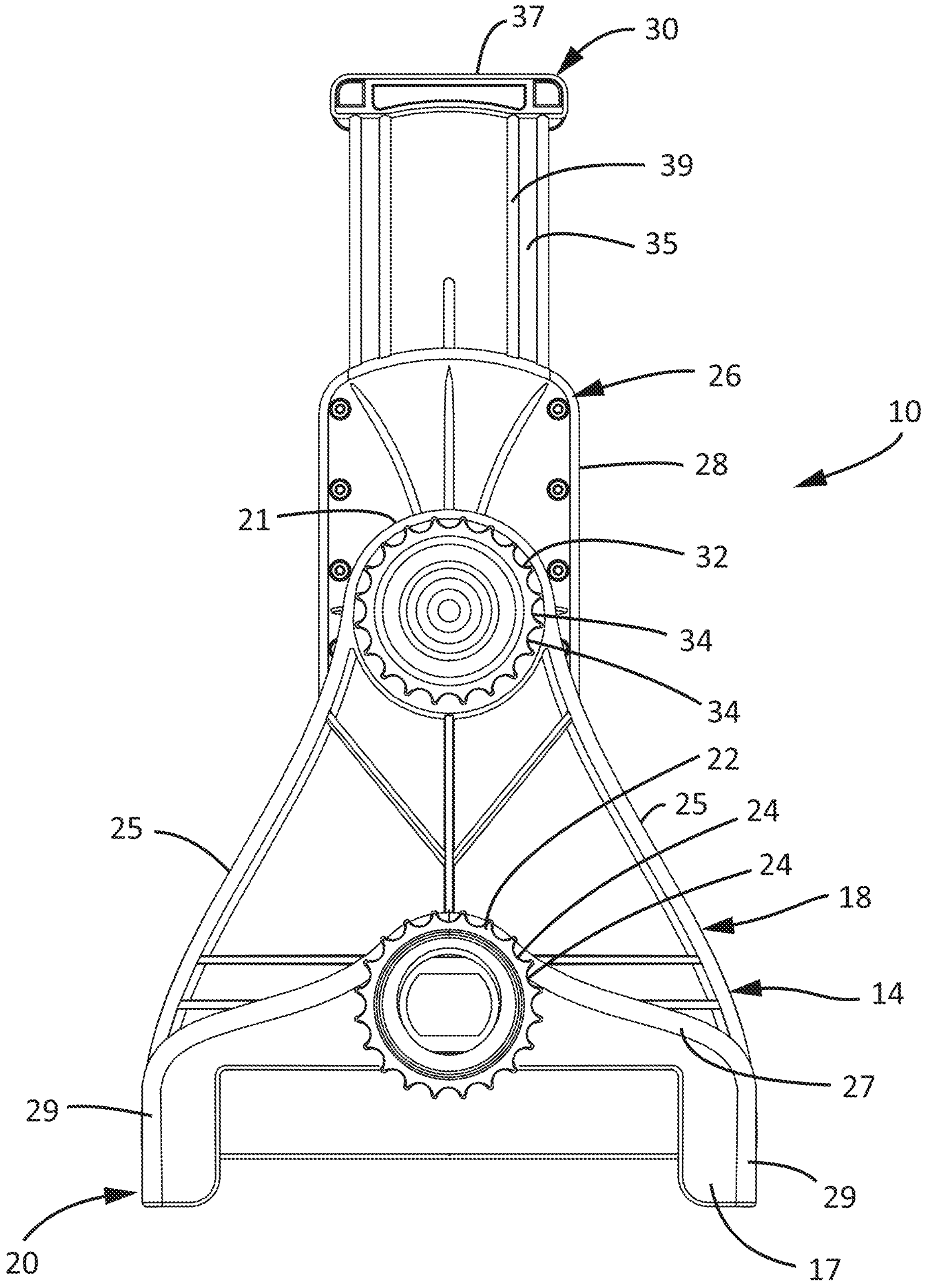
FIG. 2 is a rear view of the mobile device holder.
Figure 3:
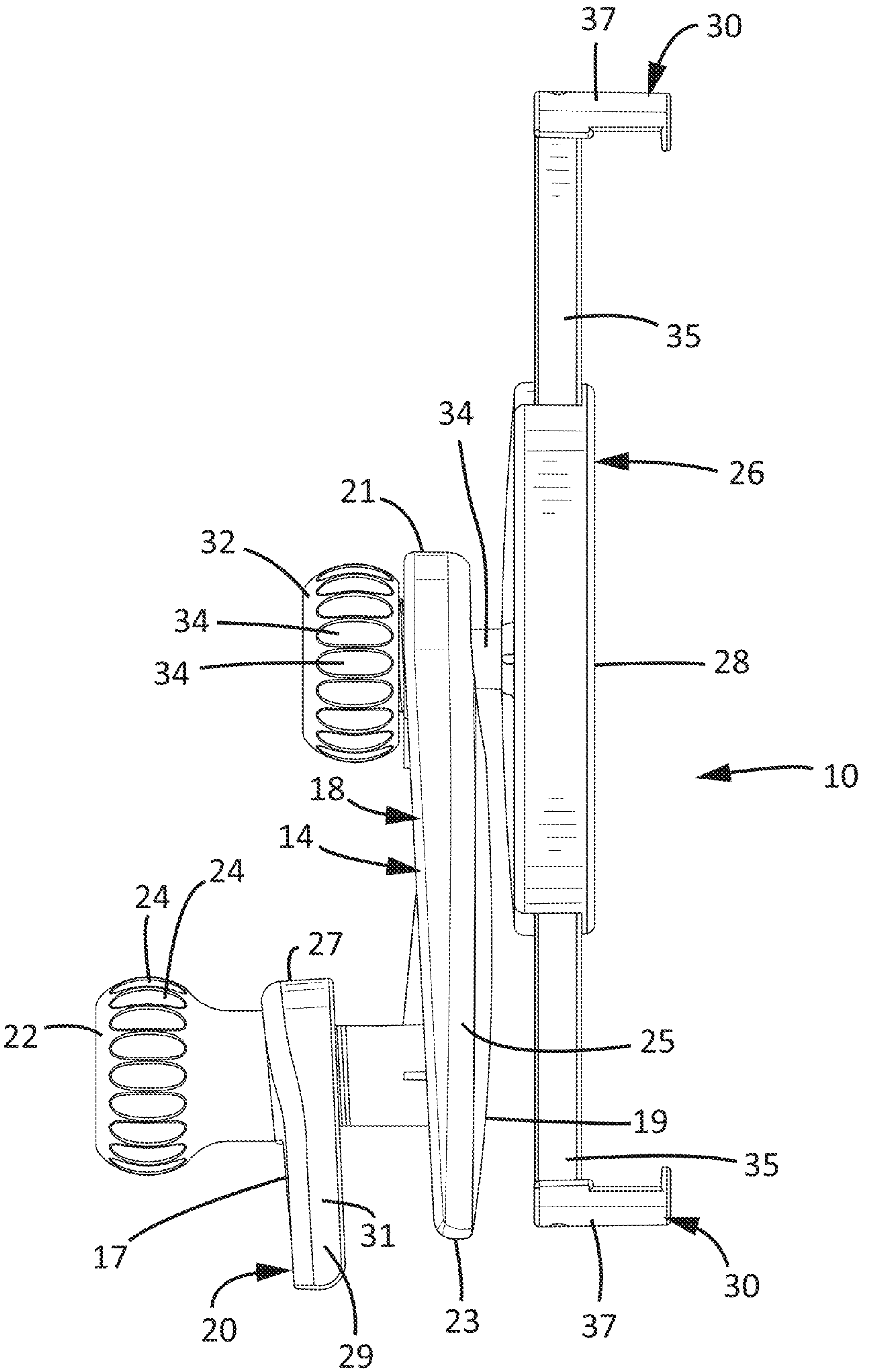
FIG. 3 is a left side view of the mobile device holder.

With reference to FIG. 1, the mobile device support 10 includes a machine bracket 14 that is configured to connect the mobile device support 10 to a control monitor 16 of a rowing machine (connection shown in FIGS. 4-9). The control monitor 16 may be of the type that is used to keep track of statistics associated with an exercise (e.g., a workout time and/or distance covered). While the preferred embodiment is directed toward use on the control monitor 16 of a rowing machine, it should be appreciated that the subject mobile device support 10 could be connected to other displays or objects, e.g., a control monitor of a treadmill.

As shown in FIG. 1, the machine bracket 14 has a first member 18 that generally has a triangular shape with a generally flat front face 19. The first member 18 has a top 21 and bottom 23 and has a pair of sides 25 that taper outwardly between the top 21 and bottom 23. Each of the sides 25 is sloped from front to back to a point that is generally perpendicular to the front face 19. The first member 18 of the machine bracket 14 could have other shapes without departing from the scope of the present disclosure.

The machine bracket 14 also has a second member 20 that is located adjacent to the bottom 23 of the first member 18 and generally has an inverted U-shape and has a generally flat rear face 17 that is in spaced and parallel relationship with the front face 19 of the first member 18. The second member 20 has a top component 27 and a pair of side components 29 that extend perpendicularly to the top component 27. The second member 20 has a rim 31 that extends along the top and side components 27, 29 for overlying a top and sides of the control monitor 16 for fitting the second member over the control monitor 16. The second member 20 of the machine bracket 14 could have other shapes without departing from the scope of the present disclosure.

The first and second members 18, 20 are moveable toward and away from one another for being clamped against the control monitor 16 to secure the mobile device 12A, 12B to the control monitor (shown in FIGS. 4-9).

A machine adjustment knob 22 threadedly extends through the first and second members 18, 20 for tightening and loosening the first and second members 18, 20 on opposing sides of the control monitor 16 to permit the mobile device support 10 to be attached and disconnected from the control monitor 16. In other words, the machine adjustment knob 22 moves the first and second members 18, 20 toward and away from one another to secure the machine bracket 14 to the control monitor 16. The machine adjustment knob 22 includes a plurality of radial indents 24 to assist a user in gripping the machine adjustment knob 22. Other styles of tightening fasteners could be used in place of the threaded machine adjustment knob 22.

A device holder 26 is connected to the first member 18 of the machine bracket 14. The device holder 26 is configured to hold the mobile device 12A, 12B. As will be discussed, the device holder 26 is configured to hold mobile devices 12A, 12B of various sizes, e.g., a cell phone and a tablet, and is configured to allow the user to easily adjust an orientation of the device holder 26 and mobile device 12A, 12B.

Figure 9:
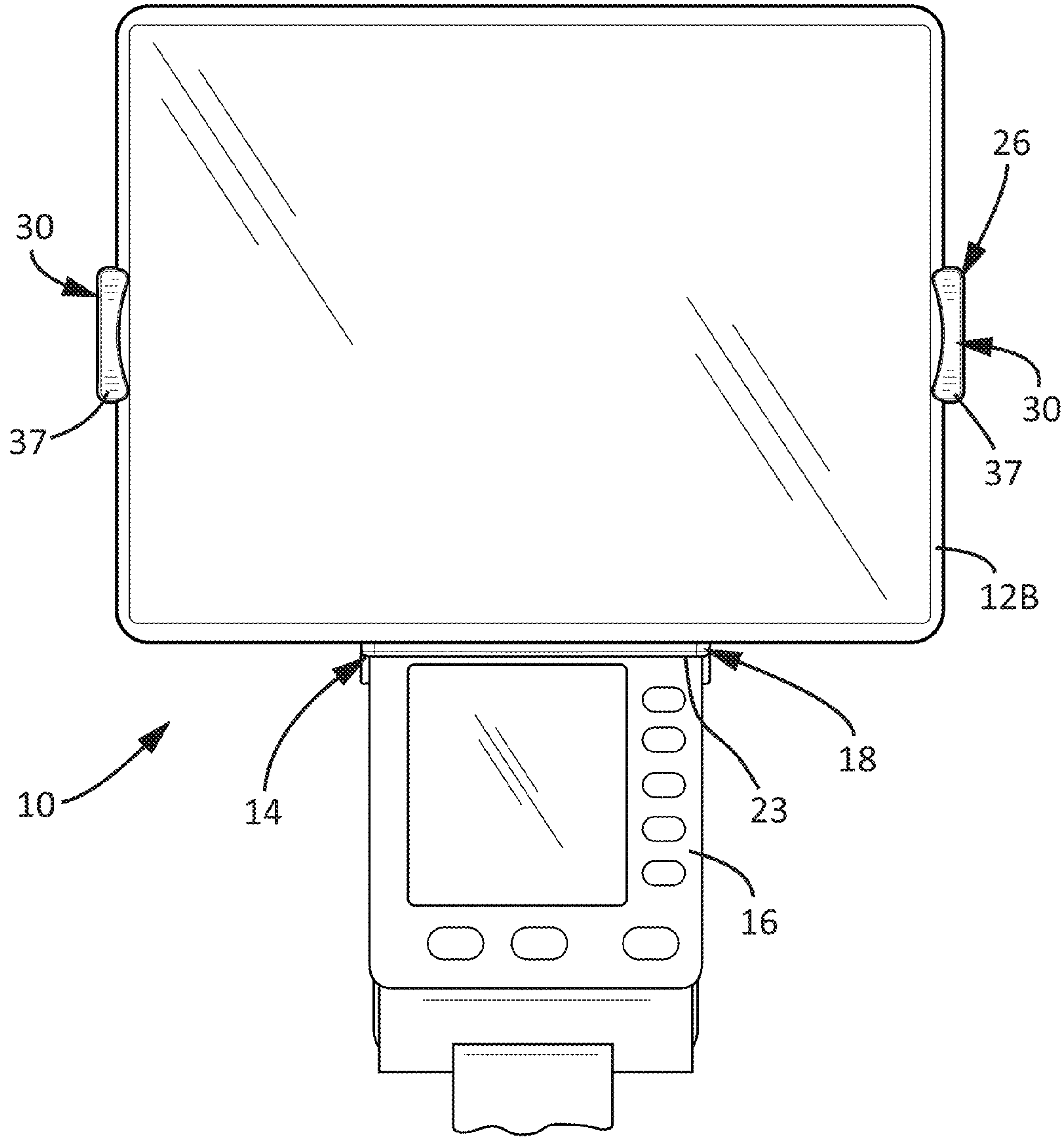
FIG. 9 is a front view of the mobile device holder, shown in the horizontal position and holding a tablet.
Figure 10:
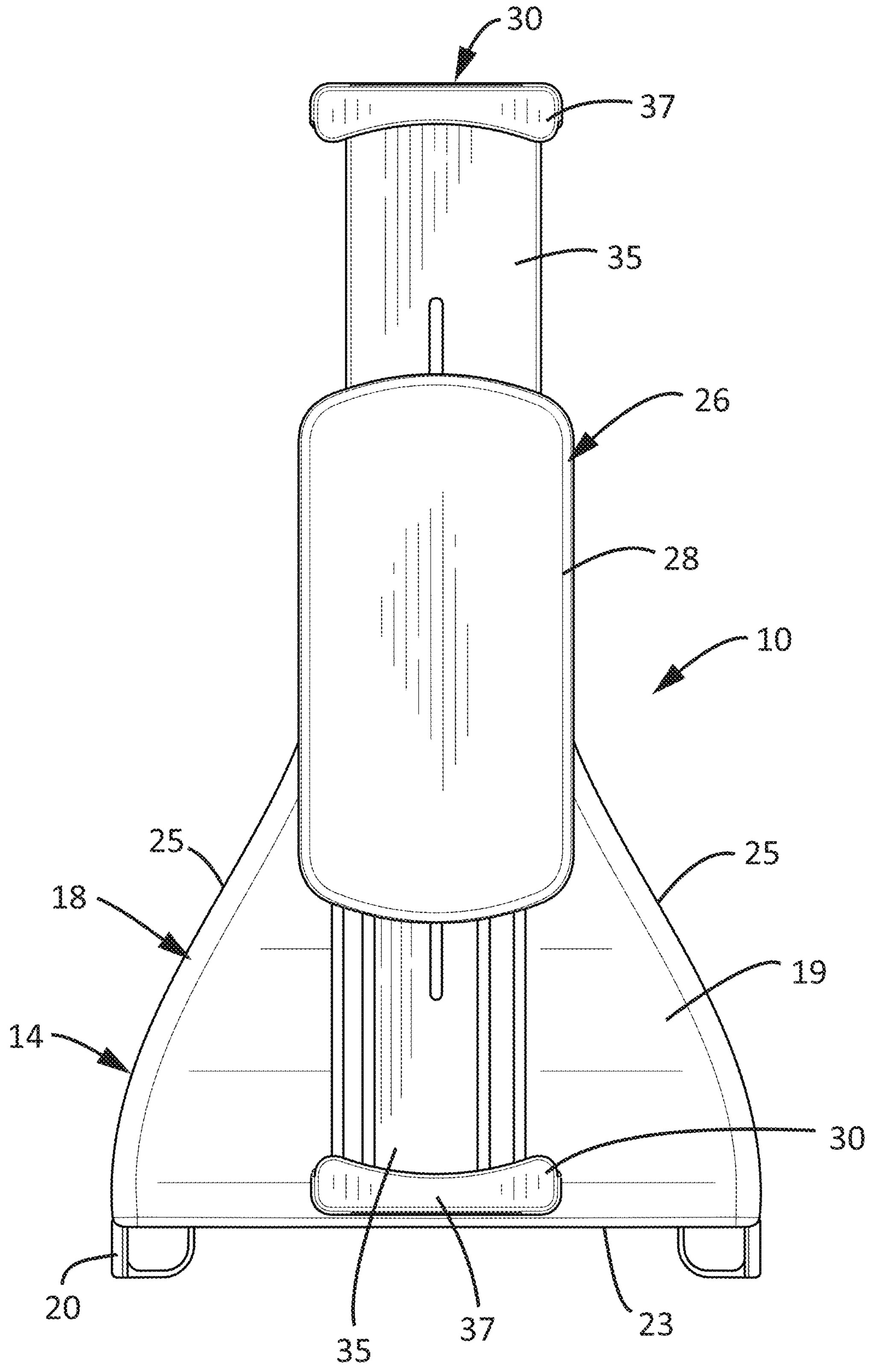
FIG. 10 is a front view of the mobile device holder.
Figure 11:
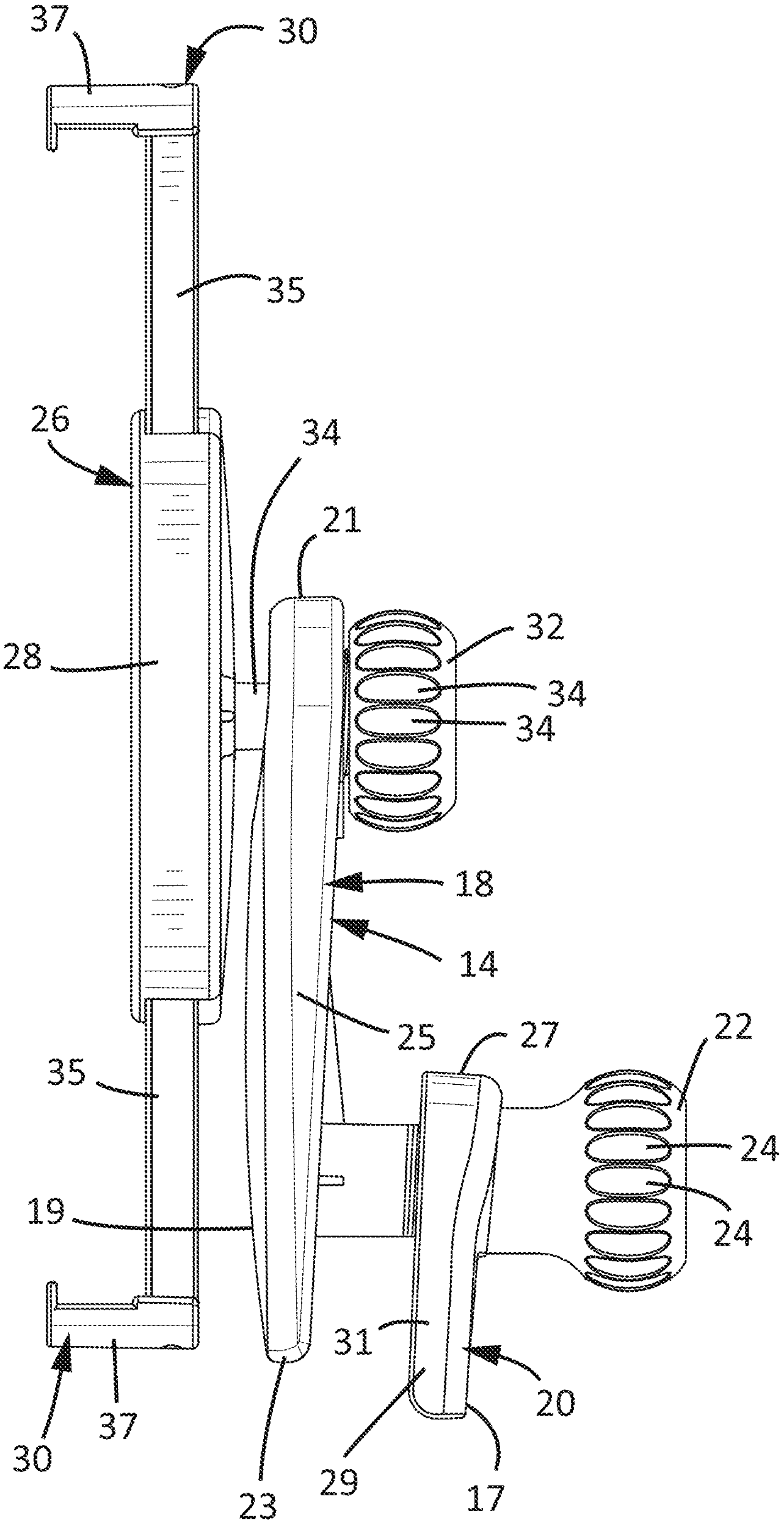
FIG. 11 is a right side view of the mobile device holder.
Figure 12:
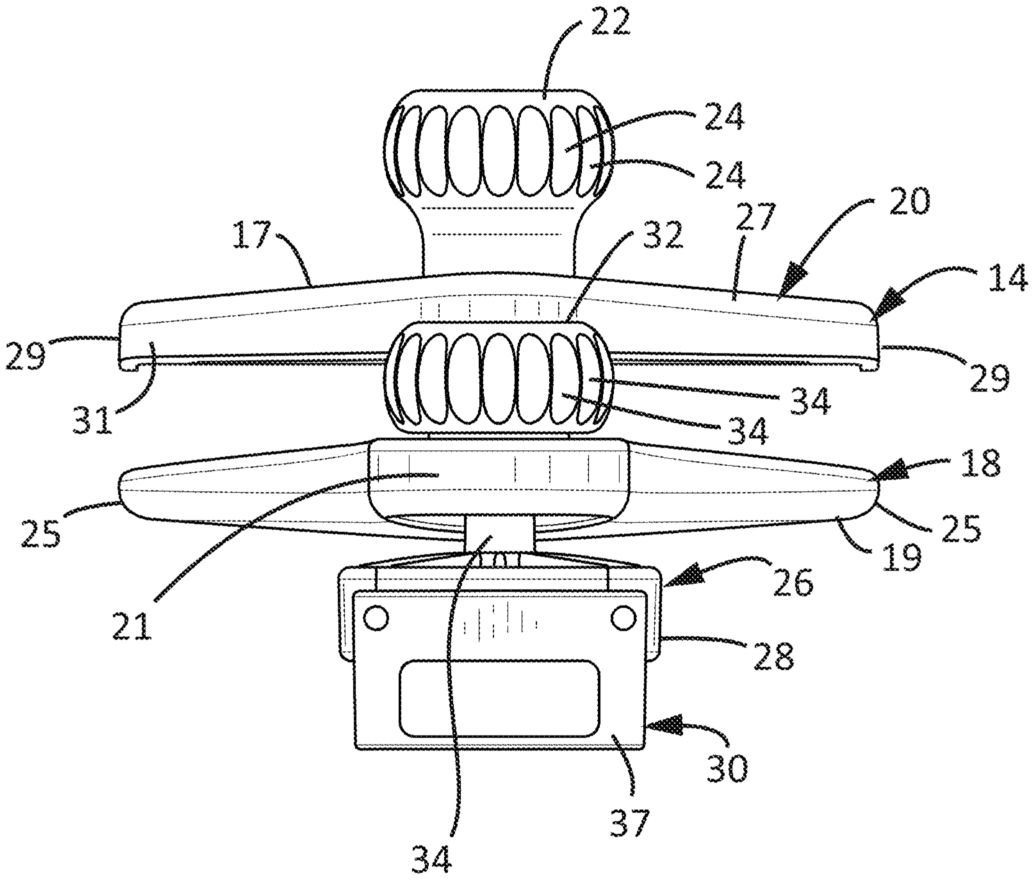
FIG. 12 is a top view of the mobile device holder.
Figure 13:
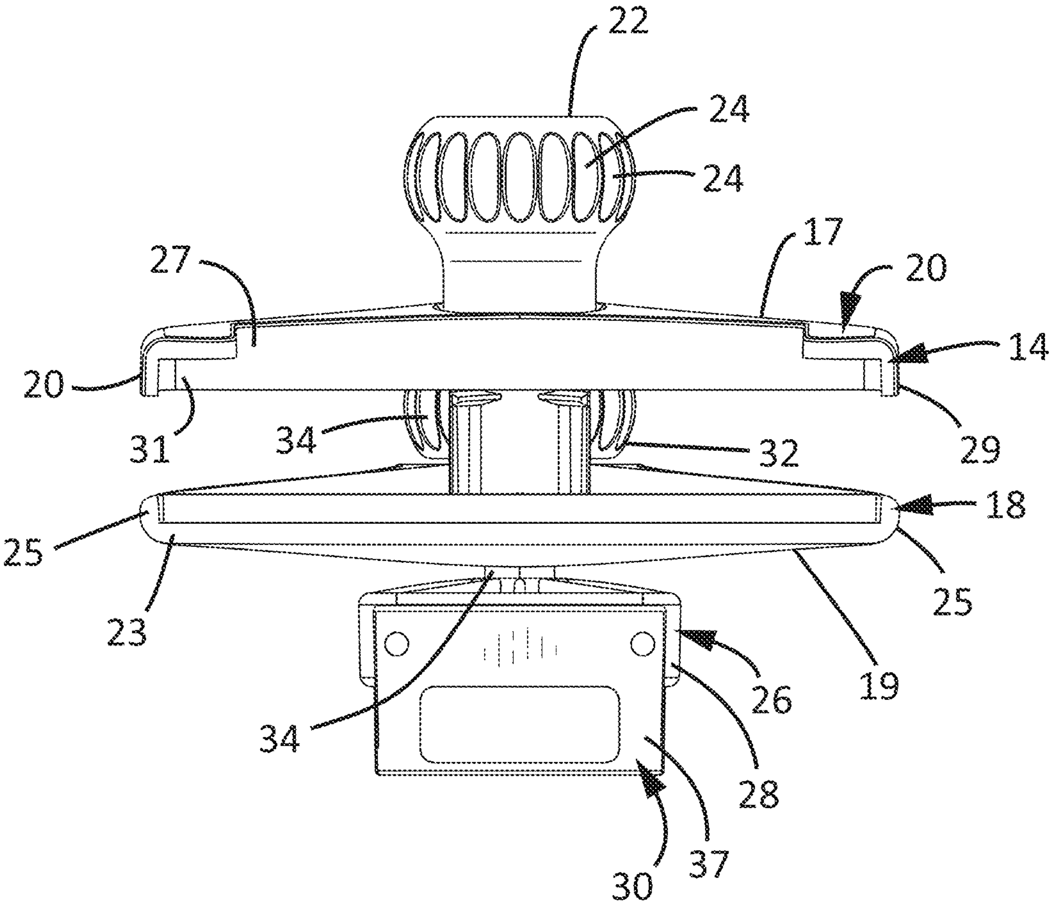
FIG. 13 is a bottom view of the mobile device holder.
Figure 14:
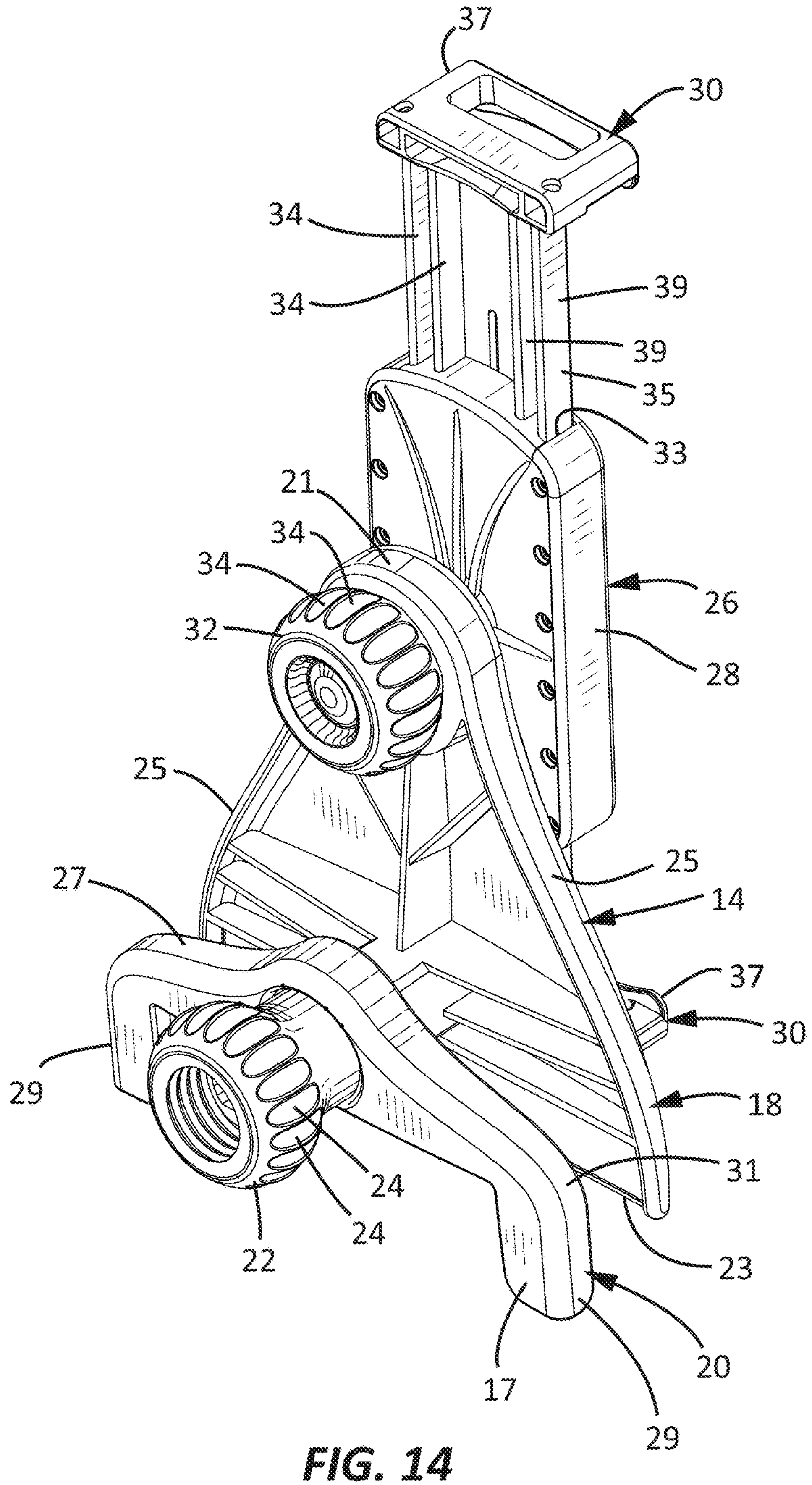
FIG. 14 is a rear perspective view of the mobile device holder.

The device holder 26 has a central member 28 and a pair of clamp arms 30 that extend from opposing sides of the central member 28. The clamp arms 30 are each slidingly connected to the central member 30 and are moveable toward and away from one another for holding mobile devices 12A, 12B of different sizes. More particularly, each of the clamp arms 30 has an arm segment 35 and a stopper segment 37 that extends generally perpendicularly to the arm segment 37. As shown in FIGS. 5, 7 and 9, when a device is held in place with the clamp arms 30, a rear surface of the device 12A, 12B overlies the arm segments 35 while the stopper segments 37 engage edges of the mobile device 12A, 12B. The central member 28 defines one or more slots 33 which receive the arm segments 35. As shown, the arm segments 35 may include one or more rails 39 or other guiding features for guiding linear movement of the arm segments 35 toward and away from the central member 28. One or both of the clamp arms 30 may be slideable away from one another. As shown by way of example in FIGS. 4-9, the clamp arms 30 are moveable to accommodate mobile devices 12A, 12B of various sizes. The clamp arms 30 are biased toward one another via one or more biasing mechanisms 41 (schematically shown in FIG. 1) such as springs which provides a clamping action against the mobile device 12A, 12B.

Figure 4:
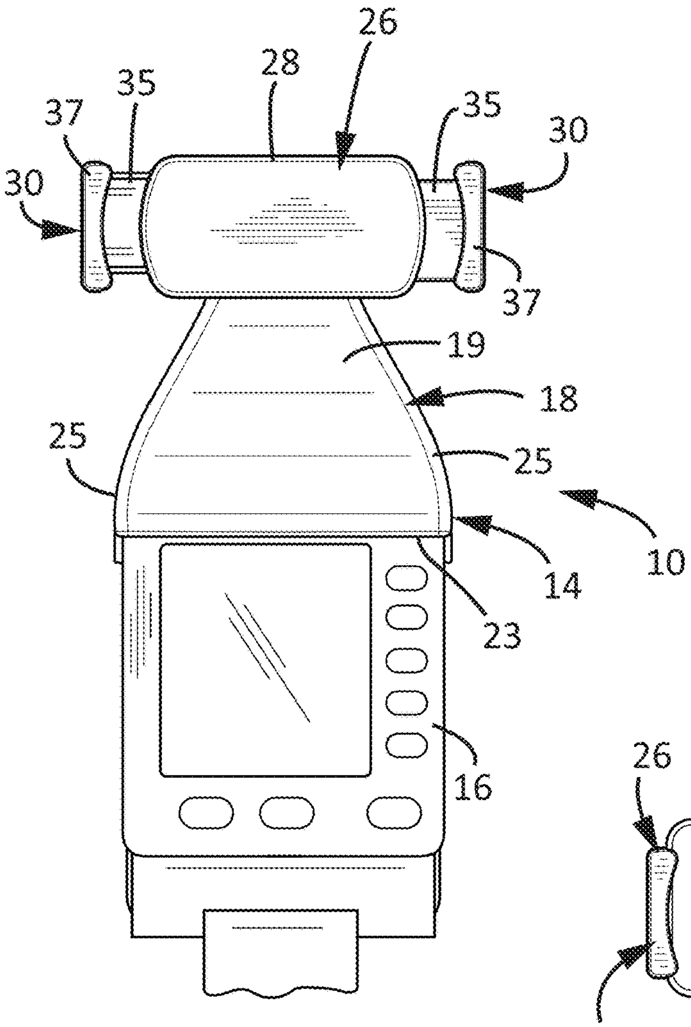
FIG. 4 is a front view of the mobile device holder, shown in a horizontal position.
Figure 5:
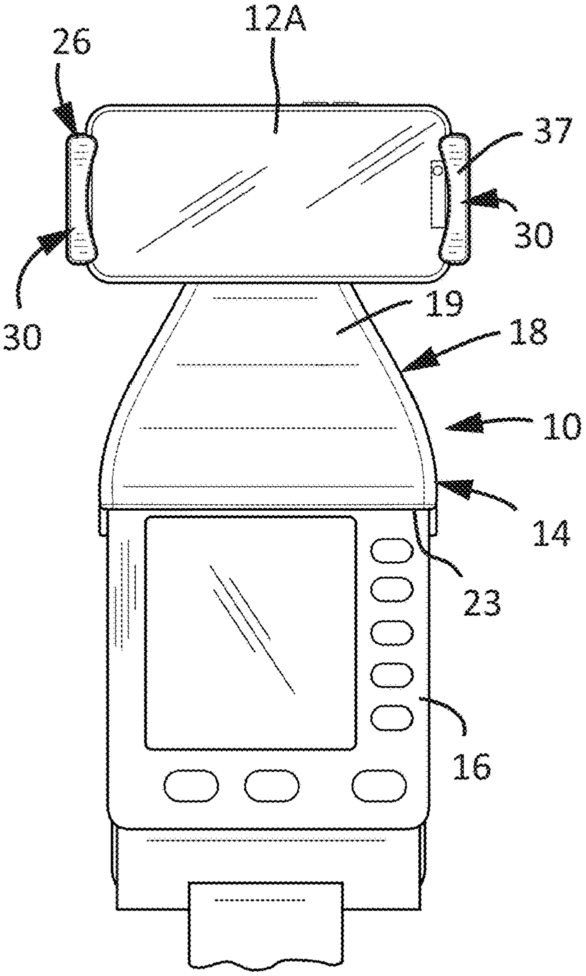
FIG. 5 is a front view of the mobile device holder, shown in the horizontal position and holding a cell phone.
Figure 6:
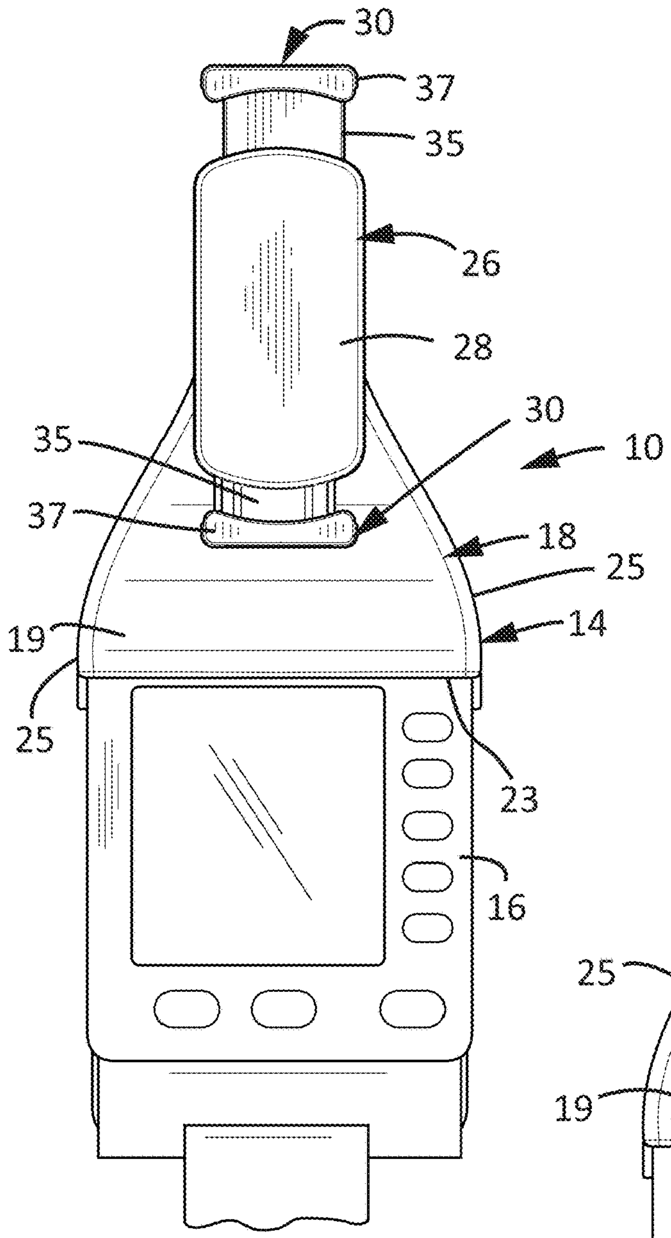
FIG. 6 is a front view of the mobile device holder, shown in a vertical position.
Figure 7:
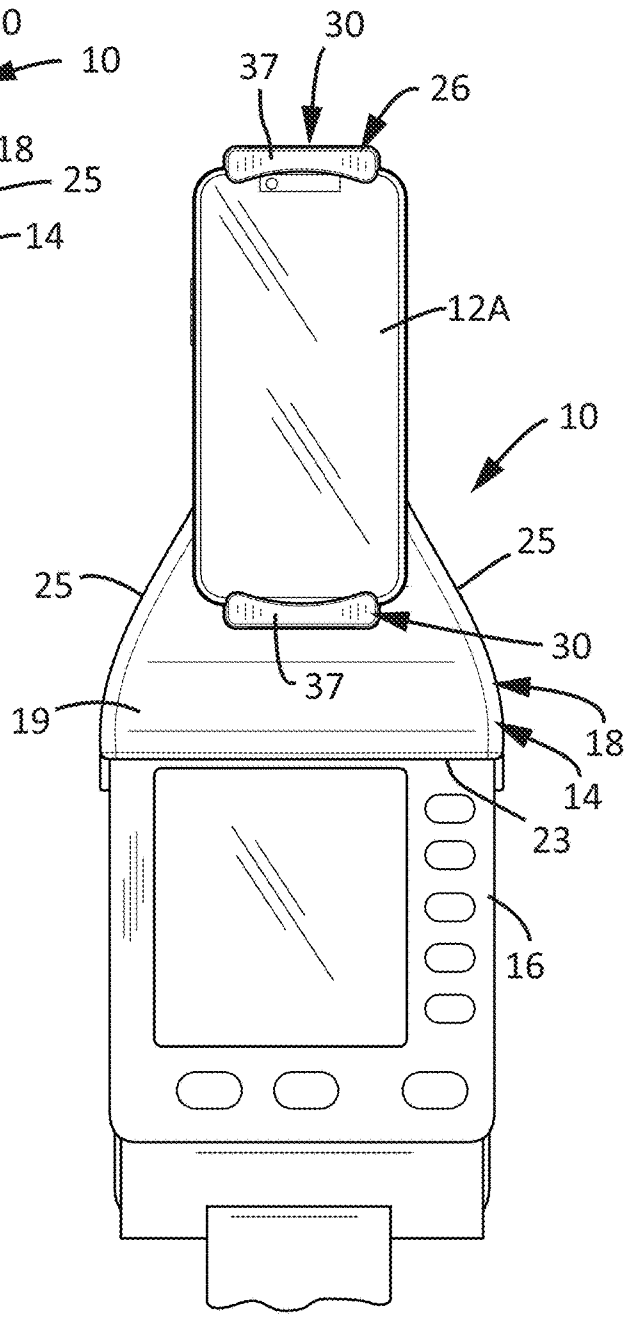
FIG. 7 is a front view of the mobile device holder, shown in the vertical position and holding a cell phone.
Figure 8:
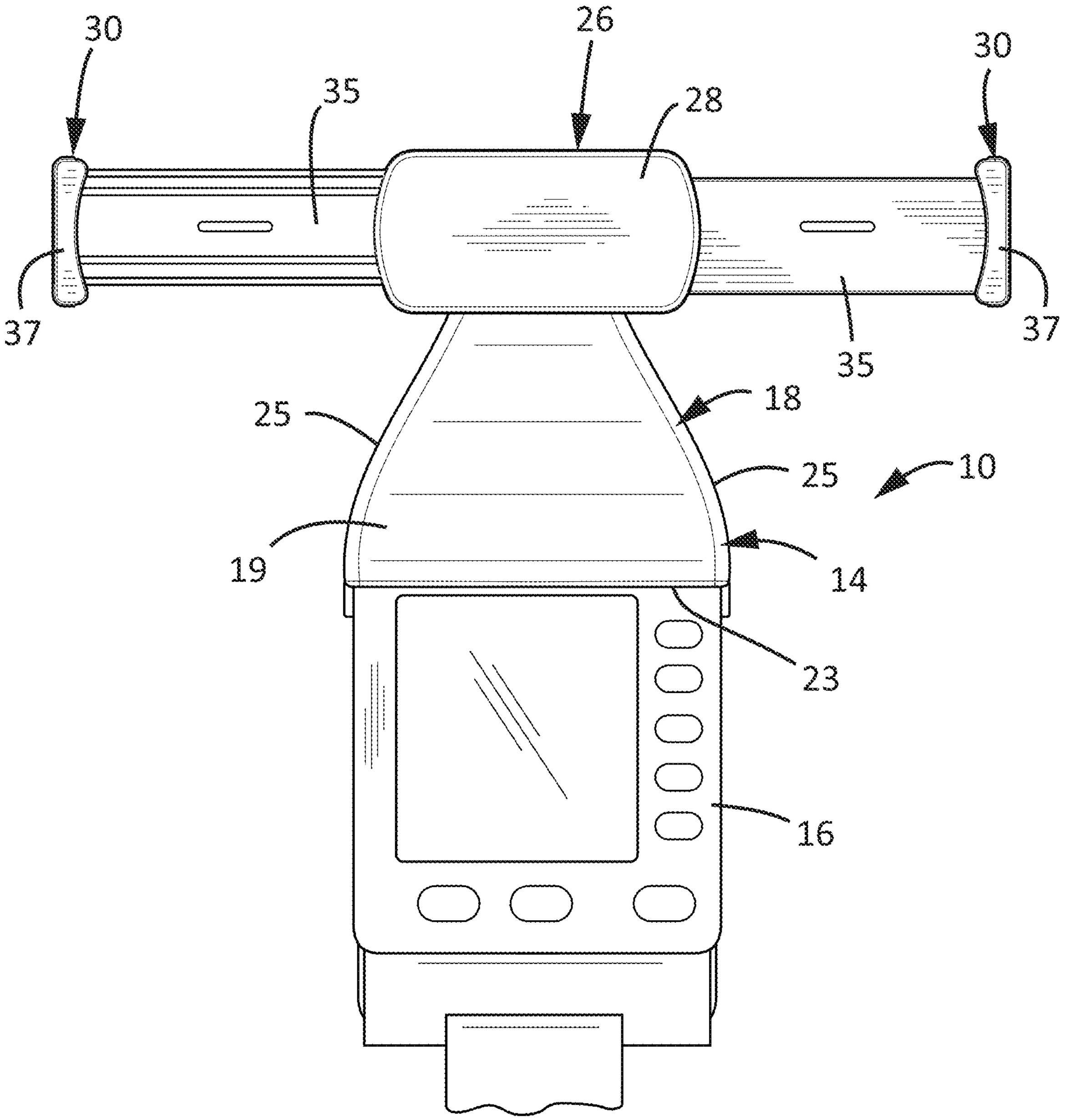
FIG. 8 is a front view of the mobile device holder, shown in the horizontal position.

As shown by way of example in FIGS. 4 and 6, the central member 28 of the device holder 26 is rotatably connected to the first member 18 of the machine bracket 14. This permits an orientation of the device holder 26 and mobile device 12A, 12B connected thereto to be adjusted. More particularly, the central member 28 includes a cylinder 34 extending from its rear face and rotatably engages the first member 18 of the machine bracket 14.

A holder adjustment knob 32 threadedly extends through the first member 18 of the machine bracket 14 and the cylinder 34 of the device holder 26 for tightening the device holder 26 to the first member 18. This permits the user to selectively inhibit rotation of the device holder 26 relative to the first member 18 once the mobile device 12A, 12B is oriented in a desired position.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in that particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or later, or intervening element or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to described various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mobile device support for a rowing machine, comprising:

a machine bracket configured to connect the mobile device support to a control monitor of the rowing machine;

a device holder coupled to the machine bracket and configured to hold a mobile device, the device holder having a pair of clamp arms, wherein at least one of the clamp arms is moveable relative to the other of the clamp arms for adjusting the device holder to accommodate holding mobile devices of different sizes; and the machine bracket having a first member and a second member for being positioned on opposing sides of the control monitor, and wherein the first and second members of the machine bracket are moveable toward and away from another to secure the machine bracket to the control monitor.

2. The mobile device support as set forth in claim 1, further including a machine adjustment knob configured to selectively move the first and second members toward and away from one another.

3. The mobile device support as set forth in claim 2, wherein the machine adjustment knob threadedly extends through the first and second members.

4. The mobile device support as set forth in claim 1, wherein the device holder is rotatable relative to the machine bracket.

5. The mobile device support as set forth in claim 4, further including a holder adjustment knob rotatably coupling the device holder to the machine bracket.

6. The mobile device support as set forth in claim 5, wherein the holder adjustment knob is configured to selectively tighten the device holder to the machine bracket such that the device holder is inhibited from rotating relative to the machine bracket.

7. The mobile device support as set forth in claim 6, wherein the holder adjustment knob is threadedly connected to the device holder and the machine bracket.

8. The mobile device support as set forth in claim 1, wherein the device holder has a central member coupled with the first member of the machine bracket, and wherein the clamp arms are coupled to the central member and at least one of the clamp arms is moveable relative to the central member.

9. The mobile device support as set forth in claim 8, wherein both of the clamp arms are moveable relative to the central member.

10. The mobile device support as set forth in claim 8, wherein the central member is rotatable relative to the first member of the machine bracket.

11. The mobile device support as set forth in claim 10, further including a holder adjustment knob rotatably coupling the central member to the first member of the machine bracket.

12. The mobile device support as set forth in claim 11, wherein the holder adjustment knob is configured to selectively tighten the central member to the machine bracket such that the central member is inhibited from rotating relative to the machine bracket.

13. The mobile device support as set forth in claim 12, wherein the holder adjustment knob is threadedly connected to the device holder and the machine bracket.

14. The mobile device support as set forth in claim 1, wherein the first member of the machine bracket has a top and a bottom, and wherein the first member tapers outwardly as it extends between the top and the bottom such that the bottom is configured to overlie a top region of the mobile device.

15. The mobile device support as set forth in claim 14, further including a holder adjustment knob rotatably coupling the device holder to the machine bracket, wherein the holder adjustment knob extends through the first member adjacent to the top of the device holder.

16. The mobile device support as set forth in claim 14, wherein the first member is substantially positioned along a plane, wherein the first member has a pair of sides extending between the top and the bottom, and wherein the sides of the first member extend generally perpendicularly to the plane of the first member such that the sides overlie side edges of the control monitor.

17. The mobile device support as set forth in claim 16, wherein the second member is positioned adjacent to the bottom first member, and wherein a machine adjustment knob extends through the first and second members and is configured to selectively move the first and second members toward and away from one another to clamp the first and second members about the control monitor.

18. The mobile device as set forth in claim 17, wherein the second member generally has a U-shape with a top component and a pair of side components extending perpendicularly to the top component, and wherein the top component is configured to overlie a top of the control monitor and wherein the side components are configured to overlie the side edges of the control member.

19. The mobile device as set forth in claim 18, wherein the second member has a rear surface being generally planar, and wherein the second member has a rim extending generally perpendicularly to rear surface for surrounding the control monitor.

20. The mobile device as set forth in 1 wherein each of the clamp arms has an arm segment and a stopper segment extending perpendicularly to the arm segment.

* * * * *